US005829570A

United States Patent [19]

Kwon

[11] Patent Number: 5,829,570

[45] Date of Patent: Nov. 3, 1998

[54] TERMINAL RAIL SYSTEM FOR ESCALATOR

[75] Inventor: Yi Sug Kwon, Kyungsangnam-Do, Rep. of Korea

[73] Assignee: LG Industrial Systems Co., Ltd., Seoul, Rep. of Korea

[21] Appl. No.: 861,074

[22] Filed: May 21, 1997

[30] Foreign Application Priority Data

May 25, 1996 [KR] Rep. of Korea .................. 1996 17869

[51] Int. Cl.$^{6}$ ..................... B65G 21/02

[52] U.S. Cl. ..................... 198/326; 198/327

[58] Field of Search ..................... 198/321, 326, 198/327, 330, 333, 860.1

[56] References Cited

U.S. PATENT DOCUMENTS 4,130,192 12/1978 Kraft ..................... 198/327

5,553,697 9/1996 McClement ..................... 198/332

FOREIGN PATENT DOCUMENTS 2262203 7/1973 Germany ..................... 198/326

*Primary Examiner*—James R. Bidwell

[57] ABSTRACT

A terminal rail system for an escalator includes an escalator step having a step front roller and a step rear roller, an upper guide rail for guiding the step front roller, a lower guide rail for guiding the step rear roller, a semicircular inner casing and outer casing that are connected to each other by a side plate and engaged to a curved portion of the lower guide rail for guiding the step rear roller through a channel formed between the casings, a buffer attached to the semicircular outer casing to reduce an impact caused by the proceeding step rear roller. The terminal rail system decreases an impact resulting from the step rear roller, thereby decreasing pulsation or vibration of the step and obtaining an extended longevity of the step rear roller and the terminal rail.

15 Claims, 9 Drawing Sheets

TERMINAL RAIL SYSTEM FOR ESCALATOR

BACKGROUND OF THE INVENTION

1. Field of the Invention

The present invention relates to an escalator, and more particularly to an improved escalator terminal rail system capable of minimizing noise and vibration caused by an impact resulting from a step rear roller passing through a channel formed in the terminal rail system.

2. Description of the Prior Art

As shown in FIGS. 1 and 2, a conventional escalator includes: a pair of hand rails 1 for concurrently moving along a predetermined track thereof; a step unit 2 for transporting passengers; and a mechanical assembly 3 for driving the hand rails 1 and the step unit 2.

The mechanical assembly 3 includes: a driving unit provided with a motor 4, a speed reducer 5, a driving chain 6, a driving sprocket 7, a first terminal gear 8, a second terminal gear 11, a driving shaft 12 and a terminal rail 13; and a moving unit provided with a plurality of steps 9, a step chain 10, a step rear roller 14, and a step front roller 15.

With reference to FIGS. 3 and 4, the terminal rail 13 is provided with a semicircular inner casing 18 and a semicircular outer casing 19, wherein an end portion of the inner casing 18 is engaged to an upper end portion of a lower guide rail 17. An outer surface portion of a guide rail 16 is engaged with step rear roller 14 as the steps approach and release from the inner and outer casings 18 and 19.

The thusly constituted conventional terminal rail system serves to guide the step front roller 15. It is not furnished with an extra device for removing or decreasing noise or vibration. Therefore, the method generally used to decrease noise and vibration involves relieving escalation impact by precisely fabricating the terminal rail 13 so as to maintain a minimal gap between the inner casing 18 and the outer casing 19, through which gap the step rear roller 15 passes.

The operation of the thusly constituted escalator will now be described.

First, power generated by the motor 4 in the mechanical assembly 3 is transferred to the speed reducer 5. The speed reducer 5 drives sprocket 7 via the driving chain 6 connected there between. The first terminal gear 8, which shares a shaft with the driving sprocket 7, operates step chain 10 that is engaged with steps 9 circulating between the first terminal gear 8 and the second terminal gear 11.

The step front roller 14 travels along the upper guide rail 16, and the step rear roller 15 travels along the lower guide rail 17, so that when step 9 reaches an upper or lower end portion of the escalator, the step rear roller 15 is turned around through a channel formed in the terminal rail 13.

Particularly as shown in FIG. 4, at the upper and lower end portion of the escalator, the step front roller 14 is turned around and engaged to the first terminal gear 8, and the step rear roller 15 is turned around along the crooked terminal rail 13. At this time, the step rear roller 15 travels along an outer surface of the inner casing 18, to which it is attached and when the step rear roller 15 comes up to a curved portion leading to the terminal rail 13, the step rear roller 15 begins turning around an inner surface of the outer casing 19 to which it is closely attached.

The above-described conventional terminal rail 13 has a disadvantage, in that, during operation of the escalator, the step rear roller 15 contacts the inner surface of the outer casing 19 when positioned at the upper or lower end portion of the escalator, resulting in serious noise and vibration.

The noise and vibration being caused by such impact has been one of the most desperate problems that has yet to be solved in the conventional escalator and despite continuous efforts to overcome such a disadvantage, the noise and vibration still remain, annoyingly.

Recently in an effort to unveil the cause of such noise and vibration, there has been carried out a noise measurement experiment employing a Taguchi experimental method which considers all the possible noise factors.

FIG. 5 illustrates effects of respective noise generating factors under the Taguchi method, wherein the steeper the slope of any of the factors in the graph, the more effective it is to restrain from noise occurrence.

The experiment has revealed that the cause of noise and vibration occurring when the step 9 turns around at the upper and lower end portion of the escalator, is directed to the terminal rail 13. Meanwhile, it is also proved that "C" factors such as those in FIG. 5 are related, thus increasing or decreasing the noise and vibration resulting from an impact caused by the step rear roller 15.

Here, minium is employed in order to discover the noise creating mechanism and the location being impacted with regard to the terminal rail 13. As shown in FIG. 6, the step rear roller 15 travels along the outer surface of the semicircular inner casing 18 of the terminal rail 13 and is deviated off from a curve start point B of the outer surface of the inner casing 18. Then, the step rear roller 15 impacts a portion A (spaced about 45 degrees above an imaginary line extended from a horizontal surface line of the inner casing 18) of the inner surface of the outer casing 19 of the terminal rail 13, and turned around on and along the inner surface of the outer casing 19 of the terminal rail 13.

The step rear roller 15 does not initially touch a portion of the inner surface of the outer casing 19 corresponding to an imaginary line extended from the portion B. Rather, it touches a slightly more upward portion of the inner surface of the outer casing 19 than the imaginary line extended from the portion B. This is because the step front roller 14 is driven forwardly in conjunction with the terminal gear 8 and a driving force occurring when the step 9 is being lifted is applied thereto. Also, in accordance with the experimental result regarding the cycle of the step rear roller 15 being moved in accordance with the guide of the terminal rail 13, it is known that pressure and impact have significant influence on the outer casing 19 of the terminal rail 13.

Because the cycle of the step rear roller 15 remains constant, the step rear roller 15 repeatedly impacts the portion A of the terminal rail 13, thereby generating serious noise and vibration.

Also, while travelling along the conventional terminal rail 13, the step rear roller 15 springs up from the curve start point B to the portion A of the outer casing 19 as it proceeds along the semicircular inner casing 18 of the terminal rail 13.

In short, the conventional terminal rail system for an escalator has several disadvantages, wherein: the step rear roller 15 generates a significant amount of noise each time the step rear roller 15 impacts portion A; each moment the step rear roller 15 impacts portion A at an average rate of 0.8sec/step, the thusly amplified pulsation increases vibration of the steps 9; the step rear roller 15 and the terminal rail 13 directly impacted each other, thereby resulting in decreased longevity of each the rougher the inner surface of the outer casing 19, the larger the noise becomes; and in order to decrease the noise and vibration being caused by the impact of the step rear roller 15 on the portion A, the gap between the semicircular inner casing 18 and the outer casing 19 must be obtained by a precise fabrication thereof, thereby resulting in increased cost and decreased productivity in fabrication and assembly thereof.

SUMMARY OF THE INVENTION

Accordingly, it is a first object of the present invention to provide a terminal rail system for an escalator capable of decreasing noise and vibration caused by an impact resulting from a step rear roller.

It is a second object of the present invention to provide a terminal rail system for an escalator for reducing vibration of steps in an escalator.

It is a third object of the present invention to provide a terminal rail system for an escalator capable of expanding longevity of each of a step rear roller and a terminal rail.

It is a fourth object of the present invention to provide a terminal rail system for an escalator capable of facilitating terminal rail fabrication and its assembly to an escalator, thereby obtaining an improved productivity and cost reduction.

To achieve the above-described objects, there is provided a terminal rail system for an escalator according to the present invention which includes an escalator step including a step front roller and a step rear roller, an upper guide rail for guiding the step front roller, a lower guide rail for guiding the step rear roller, a semicircular inner casing and outer casing connected to each other by a side plate and engaged to a curved portion of the lower guide rail at which curve portion the escalator step changes a proceeding level, and for guiding the step rear roller through a channel formed between the casings, and a buffer attached to the semicircular outer casing so as to reduce an impact caused by the proceeding step rear roller.

Further, to achieve the above-described objects, there is provided a terminal rail system for an escalator according to the present invention which includes an escalator step including a step front roller and a step rear roller, an upper guide rail for guiding the step front roller, a lower guide rail for guiding the step rear roller, and a semicircular inner casing and outer casing connected to each other by a side plate and engaged to a curved portion of the lower guide rail at which curve portion the escalator step changes a proceeding level, and for guiding the step rear roller through a channel formed between the casings, wherein an interval between respective curved portions of the semicircular inner casing and outer casing are expanded for thereby reducing the impact caused by the proceeding step rear roller.

DETAILED DESCRIPTION OF THE INVENTION

With reference to the accompanying drawings, a terminal rail system for an escalator in accordance with the present invention will now be described.

Figure 1:
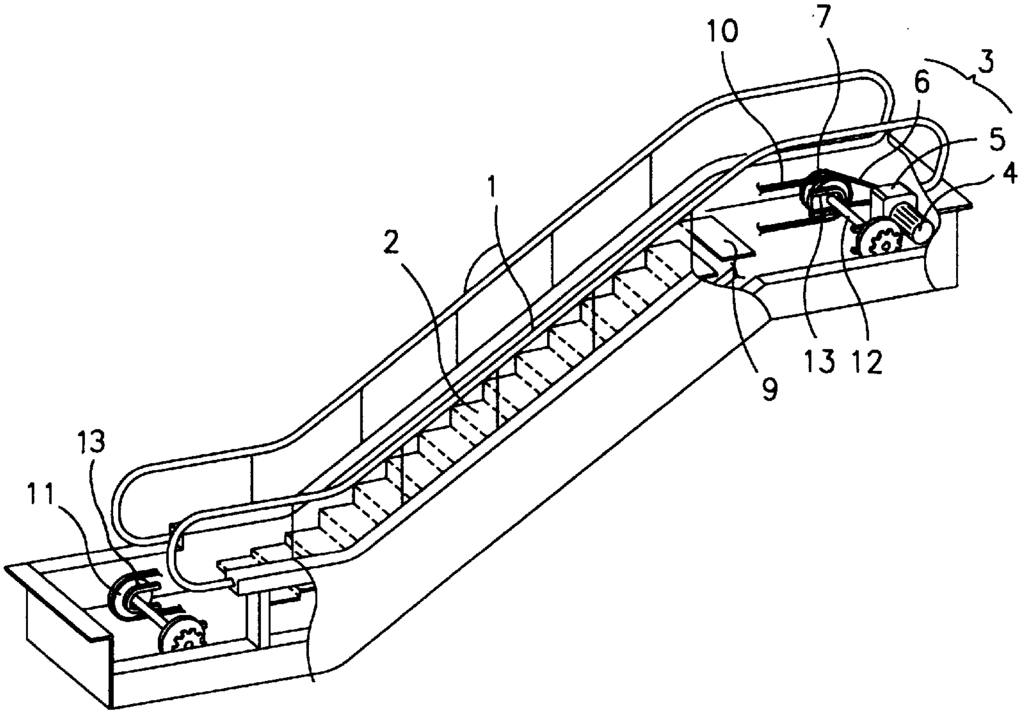
FIG. 1 CONVENTIONAL ART
FIG. 1 is a partially opened perspective view illustrating an internal and external structure of a general escalator.
Figure 2:
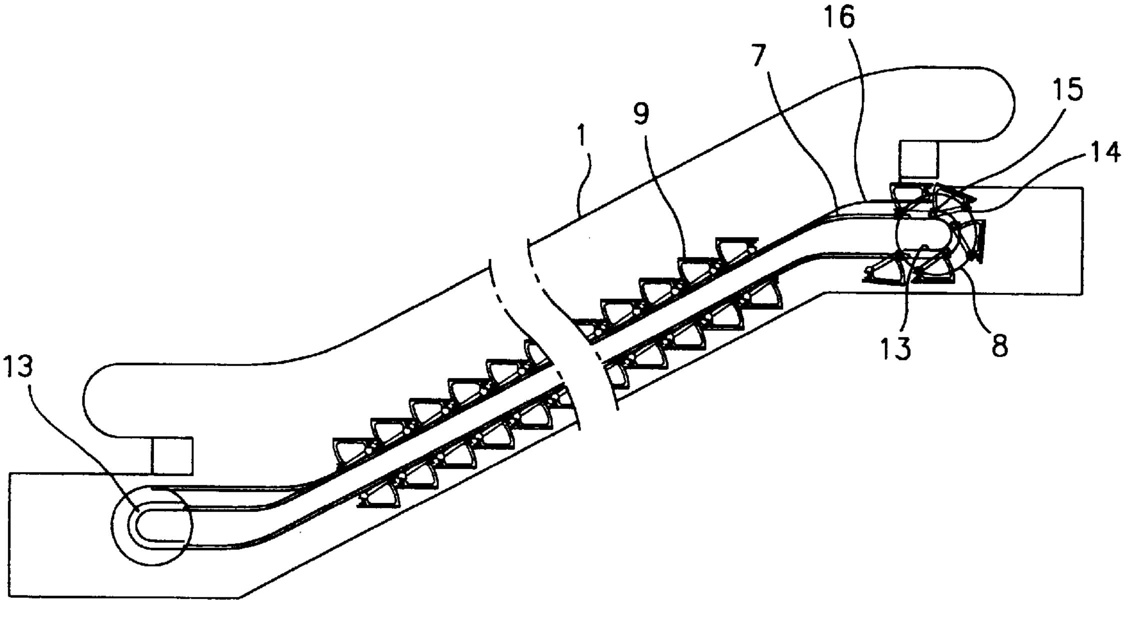
FIG. 2 CONVENTIONAL ART
FIG. 2 is a cross-sectional side view illustrating a step-driving state of the general escalator.
Figure 3:
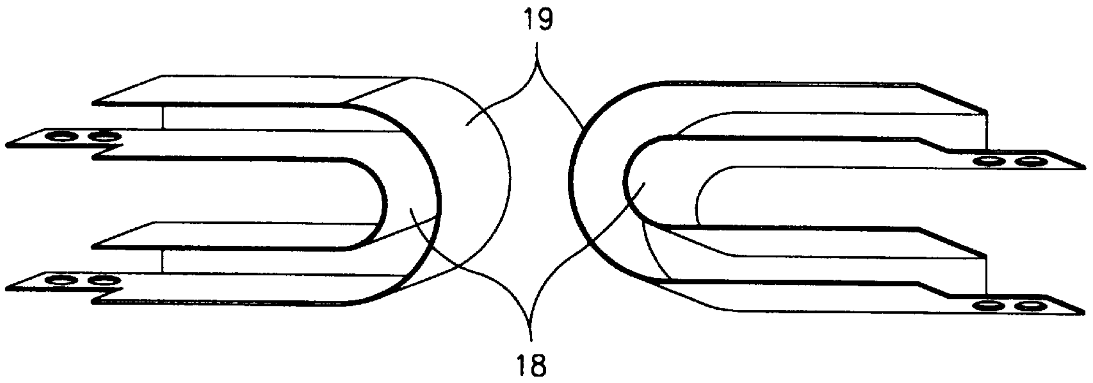
FIG. 3 CONVENTIONAL ART
FIG. 3 is a perspective view illustrating a terminal rail structure for an escalator according to a conventional art.
Figure 4:
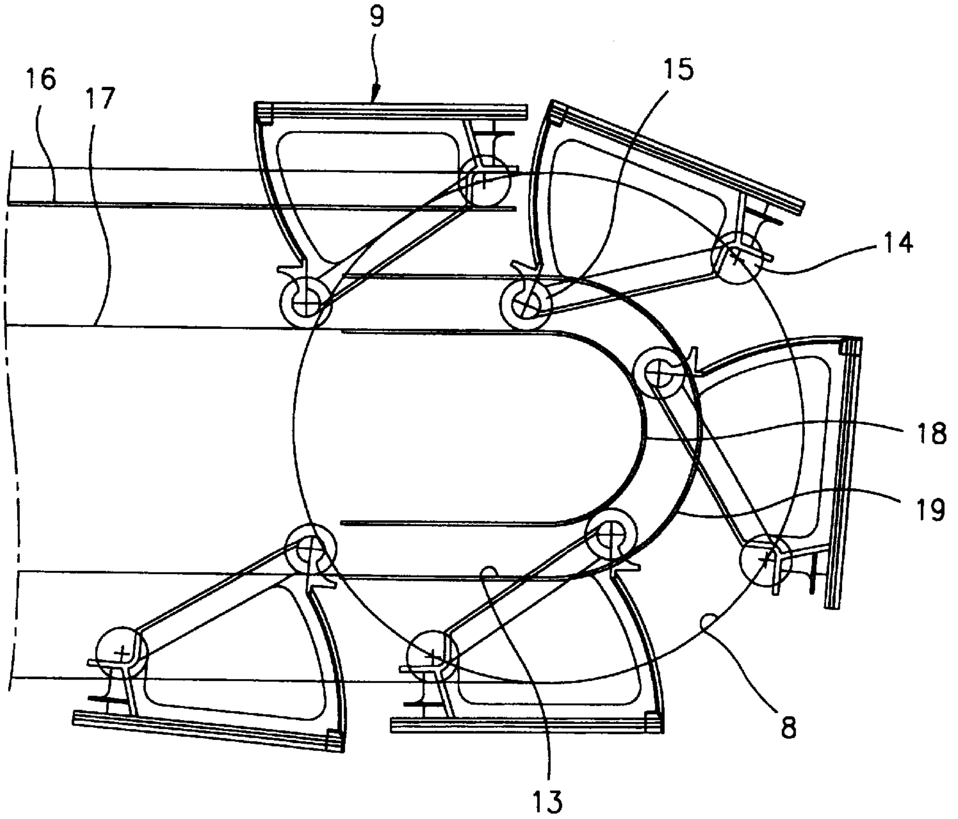
FIG. 4 CONVENTIONAL ART
FIG. 4 is a combination view illustrating the terminal rail as it relates to a guide rail according to the conventional art.
Figure 5:
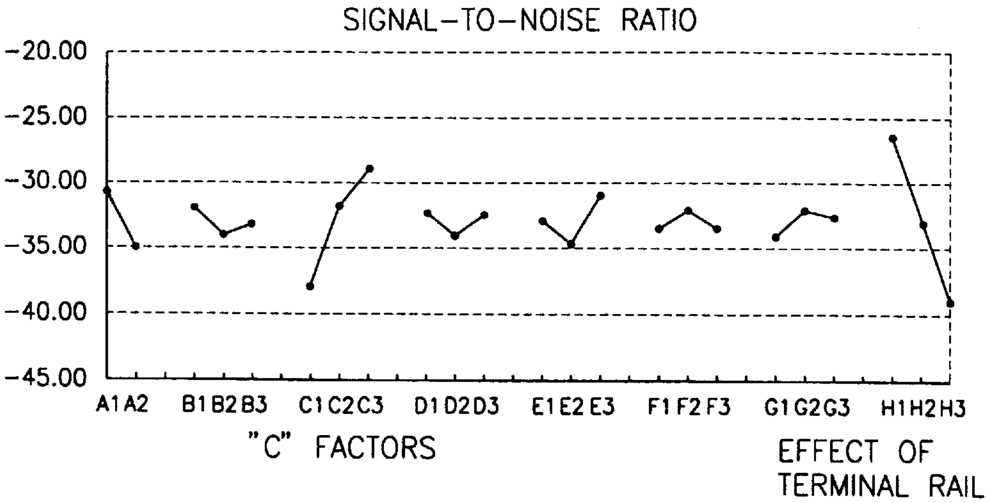
FIG. 5 CONVENTIONAL ART
FIG. 5 is a graph illustrating S/N ratio resultants and effects of noise factors disclosed in accordance with a Taguchi experiment method view according to the conventional art.
Figure 6:
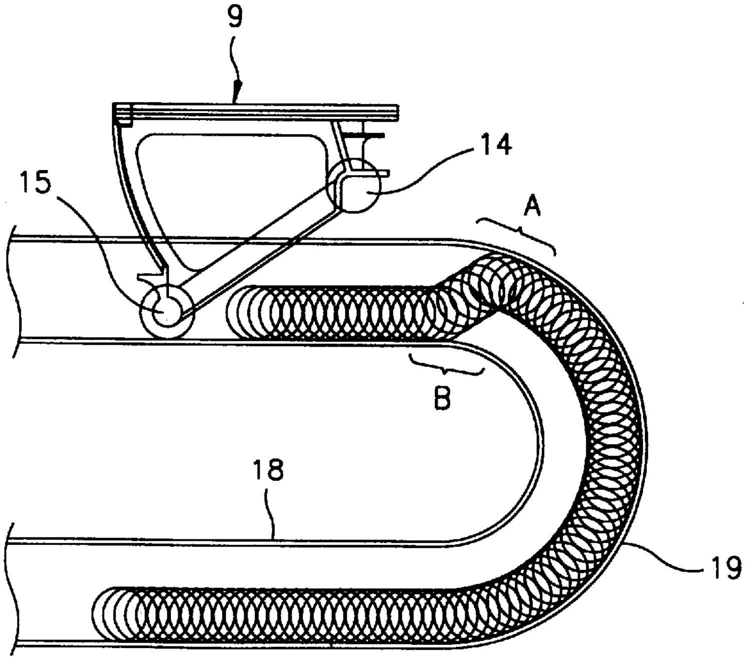
FIG. 6 CONVENTIONAL ART
FIG. 6 is a track variation view illustrating movement of a step rear roller passing through the terminal rail during operation of the conventional escalator.
Figure 7:
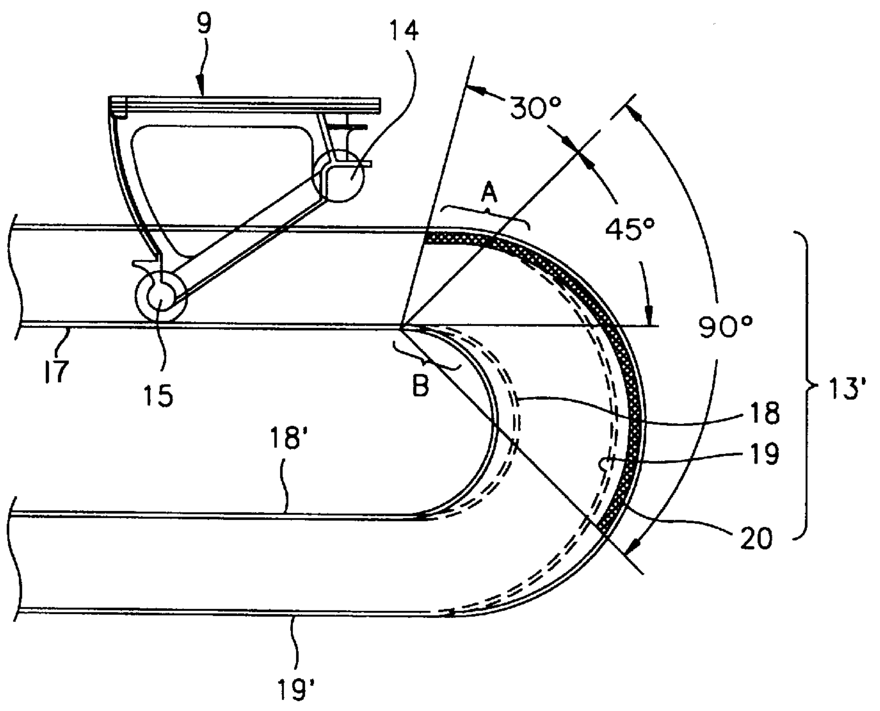
FIG. 7 is a cross-sectional side view of a terminal rail structure according to a first embodiment of the present invention.
Figure 8:
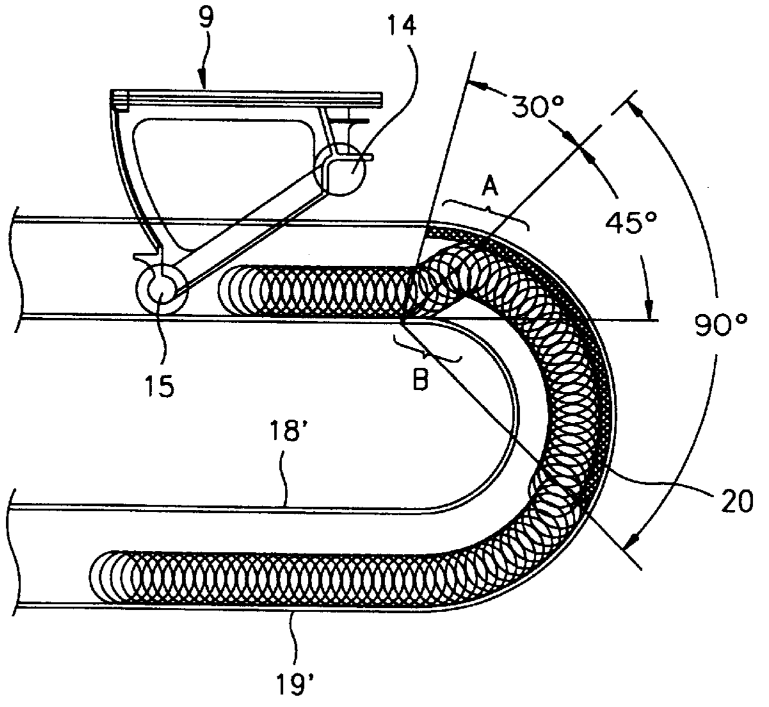
FIG. 8 is a track variation view illustrating movement of a step rear roller passing through the terminal rail during operation of an escalator according to the present invention.

FIG. 7 shows a cross-sectional side view of a terminal rail structure according to a first embodiment of the present invention, and FIG. 8 shows a track variation view illustrating movement of a step rear roller passing through the terminal rail during operation of an escalator according to the first embodiment of the present invention. As shown therein, in the terminal rail 13' according to the present invention, a gap between an semicircular inner casing 18' and an semicircular outer casing 19' is widely formed relative to that of the conventional one.

The mechanism of the present invention may be expressly understood by detailing an instrumental assembly of the upper portion of the escalator.

A step front roller 14 is turned round along a first terminal gear 8, and a step rear roller 15 is tracked along the terminal rail 13'. Thus, when the step front roller 14 is turned round along a predetermined track in accordance with the terminal gear 8, a gap between the semicircular inner casing 18' and the outer casing 19' is rendered wider than that of the conventional art, wherein a rounded portion of the outer casing 19' is outwardly expanded relative to a conventional outer casing 19, and a rounded portion of the semicircular inner casing 18' is inwardly contracted, relative to a conventional inner casing 18 whereby the furtherly widened gap serves to facilitate movement of the step rear roller 15 along the terminal rail 13'.

The curvature of the semicircular inner casing 18' is identical to the semicircular outer casing 19', so that the curvature center of the semicircular inner casing 18' is moved toward the lower guide rail 17. The outer casing 19' has a curvature thereof identical to that of the inner casing 18', and the curvature the lower guide rail 17.

An impact on the inner surface of the outer casing 19' becomes smaller, and the vibration and noise caused by the impact become minimized in accordance with the expanded interval between the semicircular inner casing 18' and the outer casing 19'. Further, during fabrication of the terminal rail 13' according to the present invention, a process for precisely forming the interval is not required.

Meanwhile, the step rear roller 15 travels on and along the outer surface of the semicircular inner casing 18' of the terminal rail 13', and deviates off from a curvature portion B of the semicircular inner casing 18'. A curvature portion A of the outer casing 19' is selected for optimally buffering the noise and vibration occurring as a result of the impact. Specifically a portion which is spaced 45 degrees upwardly from an imaginary line extended from the flat surface of the semicircular inner casing 18' is designated as an impact center. A buffer 20 formed of a compound material such as polyurethane is attached onto a portion of the inner surface of the outer casing 19', at a position of the inner surface of the outer casing 19' ranging from 30 degrees upwardly to 90 degrees downwardly starting from the imaginary line formed by connecting the deviation point of the portion B and the designated impact center of the portion A. The thickness of buffer 20 may be greater, lesser or same as the thickness outer casing 19'.

The operation of the terminal rail system according to the present invention will now be described.

The step front and rear rollers 14, 15 travel along the upper and lower guide rails 16, 17, respectively, at a top portion of the escalator, the step rear roller 14 is turned around along the terminal rail 13'. The step front roller 15 is turned around engaged to the terminal gear 8. Here, the step rear roller 15 is turned around along the terminal rail 13'. While moving through the track of the terminal rail 13', the step rear roller 15 travels on and along the upper surface of the semicircular inner casing 18' and deviates off from a portion B and at the same time impacts on the portion A of the outer casing 19'. The impact which occurs when the step rear roller 15 is turned around along the terminal rail 13' is absorbed by the buffer 20.

As a result, the pressure and impact applied to the inner surface of the outer casing 19' instrumentally become smaller by widening an interval between the semicircular inner casing 18' and the outer casing 19', and the resultant noise and vibration are prevented from occurring by sufficiently buffering the impact employing the buffer 20 attached on and along the inner curvature surface of outer casing 19'.

Figure 9A:
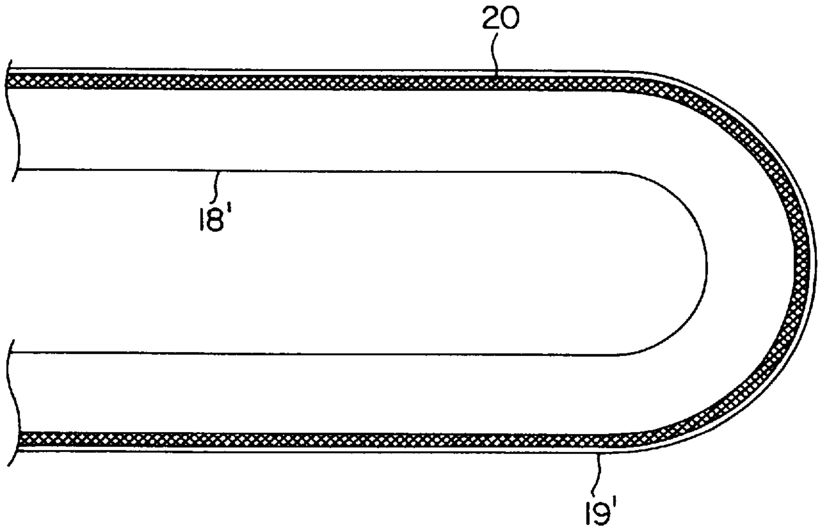
FIGS. 9A–9B are cross-sectional side views of a terminal rail structure according to a second embodiment of the present invention.
Figure 9B:
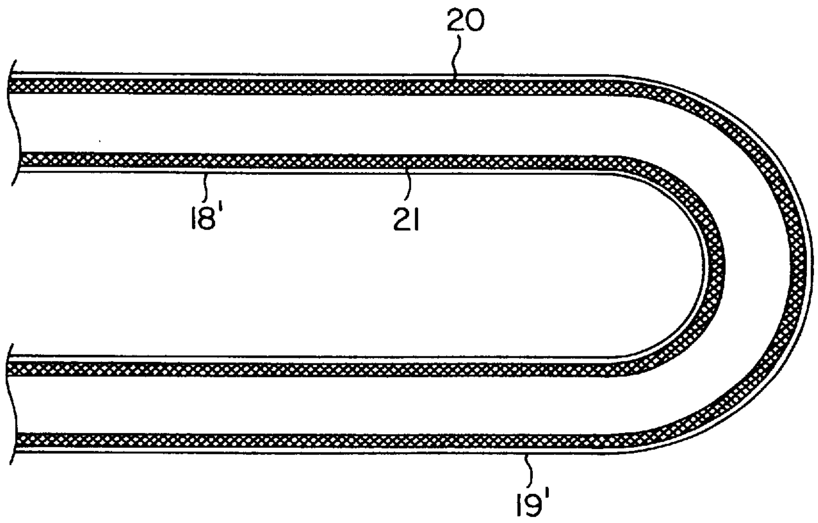

With reference to FIGS. 9A–9B illustrating a second embodiment of the present invention, a buffer 20 is formed on the entire inner surface of the outer casing 19', or may be formed both on the outer surface of the semicircular inner casing 18' and on the inner surface of the outer casing 19'.

Figure 10A:
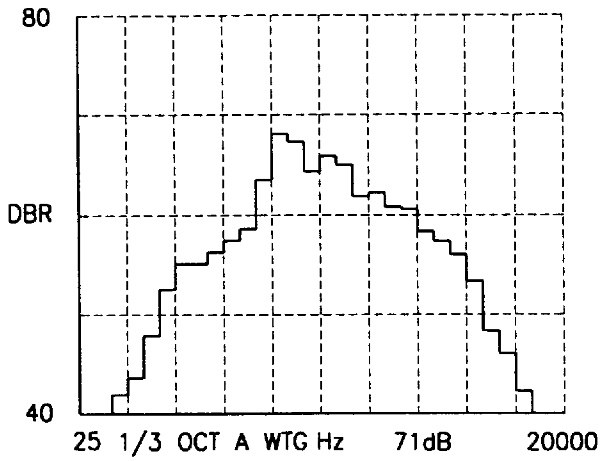
FIG. 10A (CONVENTIONAL ART)
FIG. 10A is a graph illustrating noise measurements of an escalator according to the conventional art.
Figure 10B:
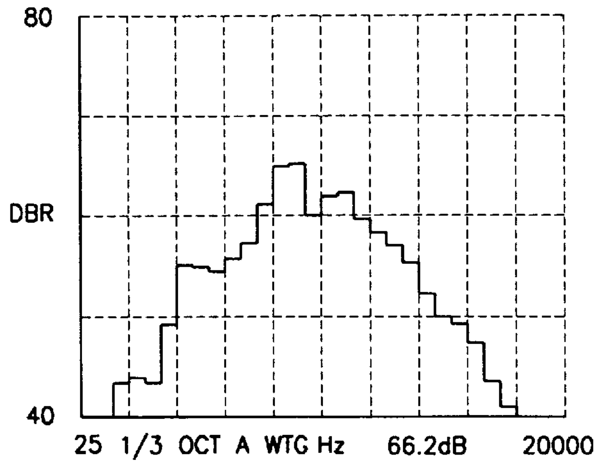
FIG. 10B is a graph illustrating noise measurements of an escalator according to the present invention so as to compare the results to the conventional escalators and disclose the effects of structural differences between the conventional terminal rail and the terminal rail according to the present invention.

FIG. 10A is a graph illustrating noise measurements of an escalator according to the conventional art, and FIG. 10B is a graph illustrating noise measurements of an escalator according to the present invention, so as to compare the results to the conventional ones and disclose a structural difference between the conventional terminal rail and one according to the present invention. As shown therein, a conventional noise level of 71 dB is decreased by about 5 dB to a level of 66.2 dB. For reference, noise level reduction of every 3 dB decreases the noise level by half.

Figure 11A:
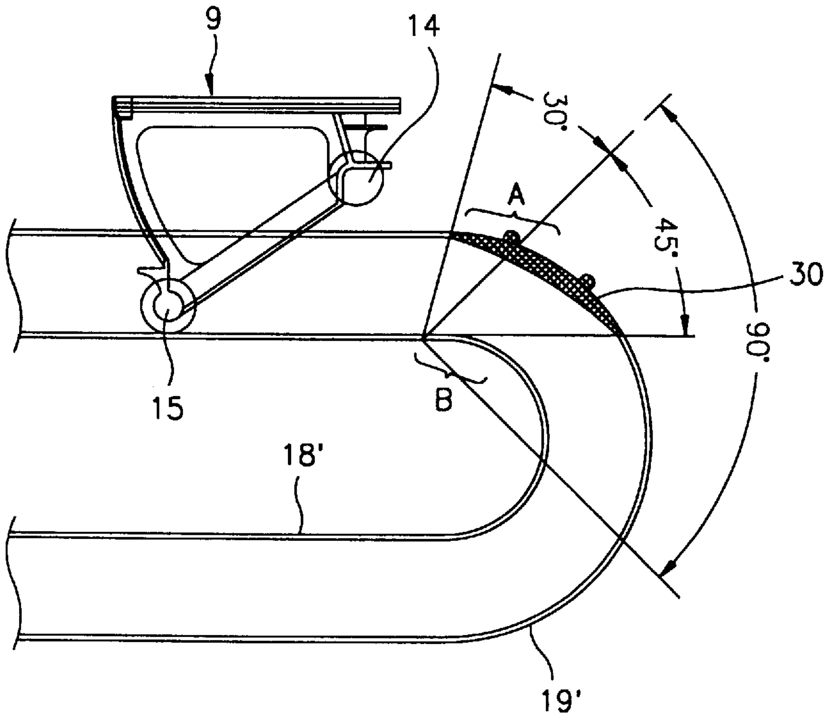
FIG. 11A is a cross-sectional side view of a terminal rail structure according to a third embodiment of the present invention.
Figure 11B:
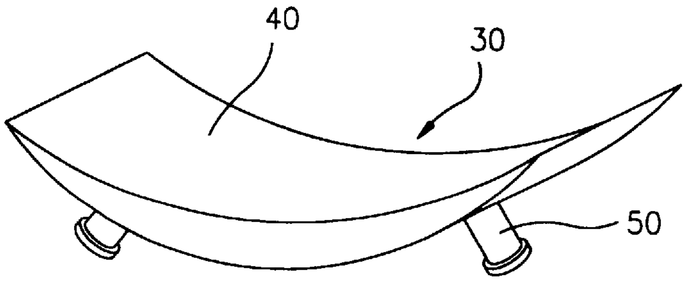
FIG. 11B is a perspective view of a buffer applied to the terminal rail structure according to the third embodiment of the present invention.

FIGS. 11A and 11B illustrate a third embodiment of the present invention, a point of an inner surface portion A of the outer casing 19' angled 45 degrees upwardly from an imaginary line extended from the flat surface of the semicircular inner casing 18' is designated as an impact center, wherein a buffer 30 is attached on and along the inner surface of the outer casing 19' which ranges from a 30-degree upward portion from the impact center to a level of the imaginary line extended from the flat surface of the semicircular inner casing 18'.

The center portion of the buffer 30 is thicker than the edge portion thereof. The buffer 30 is formed like a crescent and includes a band portion 40 and at least one pair of protrusions 50 which facilitate a fixture of the band portion 40 onto the outer casing 19', wherein the protrusions 50 are fixed into openings (not shown) formed in the outer casing 19'.

The curved buffer 30 serves to overcome a shearing stress which may occur when the step rear roller 15 incurs an impact thereon.

Figure 12:
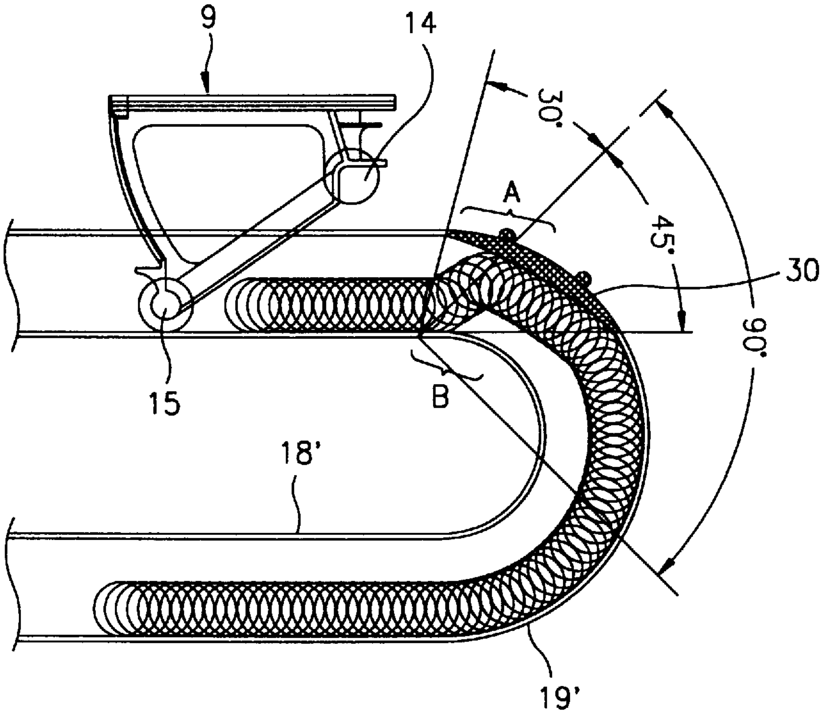
FIG. 12 is a track variation view illustrating movement of a step rear roller passing through the terminal rail during operation of an escalator adopting the terminal rail structure in FIG. 11A.

FIG. 12 illustrates a track movement of a step rear roller passing through the terminal rail during operation of an escalator adopting the terminal rail structure in FIG. 11A, the operation of the thusly constituted terminal rail system for an escalator according to the third embodiment of the present invention will now be described.

The step front roller 14 is turned round along the terminal gear 8, and the step rear roller 15 is tracked along the terminal rail 13', so that when the step front roller 14 is turned round along the curvature of the terminal rail 13', the step rear roller 15 travels on and along the upper surface of the semicircular inner casing 18'. The step rear roller 18' is turned round at the curvature portion B, and the impact thereof is sufficiently buffered by the buffer 30 attached on the portion A. At this time, the track of the step rear roller 18' remains constant, and the step rear roller 18' is appropriately buffered on the buffer 30 of the terminal rail 13', thereby preventing noise and vibration from occurring.

As shown in FIGS. 13 through 16, the present invention further provides a plurality of modified terminal rail buffers 30 in accordance therewith.

Figure 13:
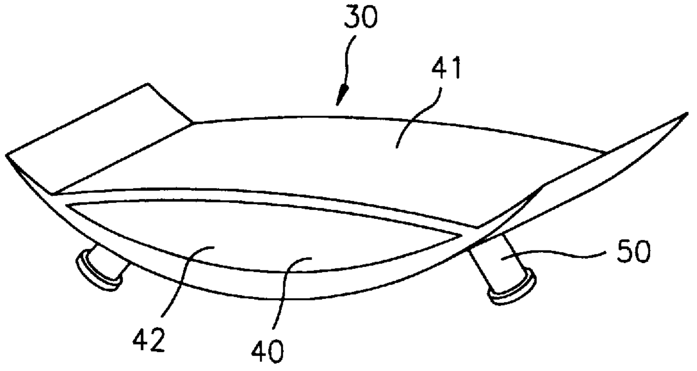
FIGS. 13 through 16 are perspective views respectively obtained by transforming the buffer in FIG. 11A according to the present invention.
Figure 14:
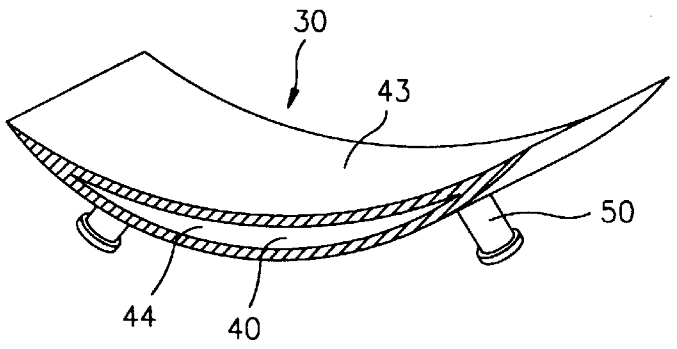
Figure 15:
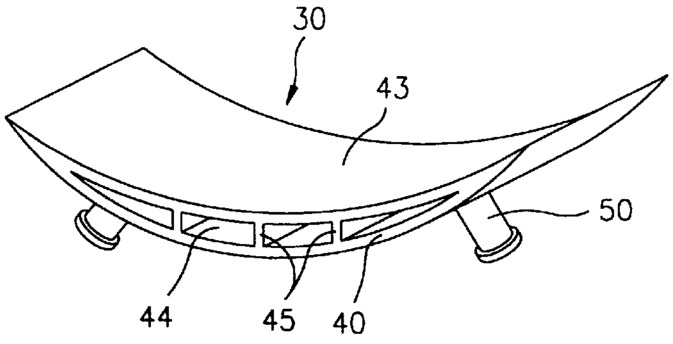
Figure 16:
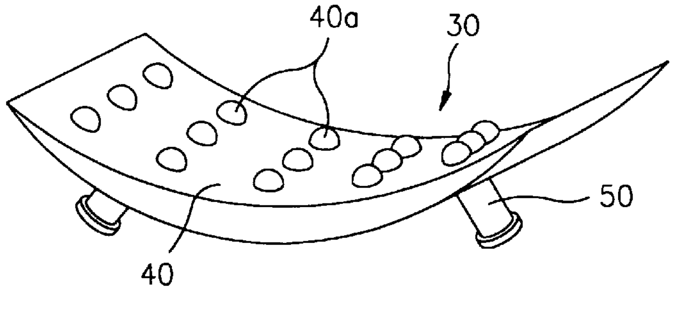

Referring to FIG. 13, a buffer 30 may include a buffer band 41 formed over the inner surface of the (buffer 30 ), so that a horizontal opening 42 is formed between the buffer band 41 and the band portion 40 for thereby relieving impact. With reference to FIG. 14, a band portion 40 and a buffer band 43 respectively have an outwardly convexed shape to from a center opening 44, thereby obtaining a buffer 30 having a double layer. As shown in FIG. 15, a plurality of vertical supports 45 are formed between a band portion 40 and a buffer band 43, whereby the vertical supports 45 buffer and support the buffer band 43. As further shown in FIG. 16, a plurality of semispheric bosses **40*a* are formed on the inner surface of the band portion 40** for thereby relieving impact.

Therefore, the buffer 30 of the terminal rail in the present invention absorbs impact caused by the step rear roller 15 and significantly decreases noise and vibration in accordance with an impact of the step rear roller 15.

As described above, the terminal rail system for an escalator according to the present invention decreases an impact resulting from a step rear roller 15, so that a pulsation or vibration is decreased and accordingly a vibration at the step 9 is remarkably decreased, thereby obtaining an extended longevity of the step rear roller 15 and the terminal rail 13'.

Further, the terminal rail system according to the present invention satisfies a robust design condition, so that there does not occur noise regardless of a measurement difference between the semicircular inner casing and the outer casing or a roughness of the surfaces of the semicircular inner casing and the outer casing.

Still further, the present invention does not seriously require a precision in an assembly work thereof, thereby significantly improving productivity.

What is claimed is:

1. A terminal rail system for an escalator, comprising:
 - an escalator step including a step front roller and a step rear roller;
 - an upper guide rail for guiding the step front roller;
 - a lower guide rail for guiding the step rear roller;
 - a semicircular inner casing and outer casing, connected to each other by a side plate and engaged to a curved portion of the lower guide rail at which curve portion the escalator step changes a proceeding level, the step rear roller being guided through a channel defined between the inner and outer casings; and
 - a buffer attached to the semicircular outer casing and positioned so as to reduce an impact caused by the proceeding step rear roller.

2. The terminal rail system of claim 1, wherein an impact point in accordance with the step rear roller is identified on the lower surface portion of the semicircular outer casing at a position spaced 45 degrees above an imaginary line extended from a horizontal flat surface line of the semicircular inner casing, and the buffer is attached on the lower surface portion between a 30-degree angle line upwardly from the impact point and a 90-degree angle line below the impact point of the semicircular outer casing.

3. The terminal rail system of claim 1, wherein the buffer is attached on an entire inner surface of the semicircular outer casing, or on the entire inner surface of the semicircular outer casing and the entire outer surface of the semicircular inner casing.

4. The terminal rail system of claim 1, wherein the buffer is assembled onto a lower surface portion of the semicircular outer casing, between a curvature start point and a point which meets an imaginary line extended from the horizontal flat surface line of the semicircular inner casing.

5. The terminal rail system of claim 4, wherein the buffer comprises:
 - a convex band portion having a cross-sectional arc; and
 - at least one pair of protrusions formed on an outer surface of the convex band portion, whereby the protrusions are fixedly inserted into corresponding portions of the semicircular outer casing.

6. The terminal rail system of claim 5, wherein a plurality of semispheric embossings are formed on an inner surface of the convex band portion so as to reduce impact caused by the step rear roller.

7. The terminal rail system of claim 5, wherein a horizontal opening is formed between a downwardly convexed buffer band and an upwardly convexed buffer band, thereby reducing the impact caused by the step rear roller.

8. The terminal rail system of claim 5, wherein a horizontal opening is formed between a pair of downwardly convexed buffer bands, thereby reducing the impact caused by the step rear roller.

9. The terminal rail system of claim 8, wherein a plurality of vertical supports are formed in the horizontal opening so as to support the buffer bands.

10. The terminal rail system of claim 1, wherein the buffer comprises:
 - a convex band portion having a cross-sectional arc; and
 - at least one pair of protrusions formed on an outer surface of the convex band portion, whereby the protrusions are fixedly inserted into corresponding portions of the semicircular outer casing.

11. The terminal rail system of claim 10, wherein a plurality of semispheric embossings are formed on an inner surface of the convex band portion so as to reduce impact caused by the step rear roller.

12. The terminal rail system of claim 10, wherein a horizontal opening is formed between a downwardly convexed buffer band and an upwardly convexed buffer band, thereby reducing the impact caused by the step rear roller.

13. The terminal rail system of claim 10, wherein a horizontal opening is formed between a pair of downwardly convexed buffer bands, thereby reducing the impact caused by the step rear roller.

14. The terminal rail system of claim 13, wherein a plurality of vertical supports are formed in the horizontal opening so as to support the buffer bands.

15. A terminal rail system for an escalator, comprising:
 - an escalator step including a step front roller and a step rear roller;
 - an upper guide rail for guiding the step front roller;
 - a lower guide rail for guiding the step rear roller; and
 - a semicircular inner casing and outer casing, connected to each other by a side plate and engaged to a curved portion of the lower guide rail, wherein the escalator step changes a proceeding level at the curved portion, the step rear roller being guided through a channel defined between the inner and outer casings, wherein a portion of the channel defined between respective curved portions of the semicircular inner casing and outer casing is expanded for reducing the impact caused by the proceeding step rear roller.

* * * * *